United States Patent [19]

Theis

[11] 4,152,547
[45] May 1, 1979

[54] SELECTIVE MONITOR FOR AN AUTOMATIC TELEPHONE ANSWERING SYSTEM

[76] Inventor: Peter F. Theis, 3203 Bay View La., McHenry, Ill. 60050

[21] Appl. No.: 855,725

[22] Filed: Nov. 29, 1977

[51] Int. Cl.² ............................................. H04M 1/64
[52] U.S. Cl. ............................ 179/6 R; 179/100.1 VC
[58] Field of Search ........... 179/6 C, 6 R, 2 A, 1 HF, 179/1 VC, 100.1 VC, 18 BE, 2 DP, 2 CA

[56] References Cited

U.S. PATENT DOCUMENTS

| | | | |
|---|---|---|---|
| 3,747,228 | 7/1973 | Yamamoto | 179/100.1 VC |
| 3,784,721 | 1/1974 | Kilby | 179/6 R |
| 3,935,390 | 1/1976 | Winterhalter | 179/6 R |
| 4,069,397 | 1/1978 | Hashimoto | 179/6 R |
| 4,079,200 | 3/1978 | Meri | 179/6 R |

*Primary Examiner*—Vincent P. Canney
*Assistant Examiner*—Donald McElheny, Jr.
*Attorney, Agent, or Firm*—Hume, Clement, Brinks, Willian & Olds, Ltd.

[57] ABSTRACT

A selective monitor is provided for use with an automatic telephone answering system which operates to transmit to a monitor speaker only those portions of a caller's responses which meet certain selection criteria. Operating personnel can determine which calls in which to intervene by listening to the selected responses broadcast on the monitor.

9 Claims, 3 Drawing Figures

SELECTIVE MONITOR FOR AN AUTOMATIC TELEPHONE ANSWERING SYSTEM

BACKGROUND OF THE INVENTION

This invention relates to automatic telephone answering systems which simulate conversations and more particularly to a monitor which alerts an operator to selected portions of simulated telephone conversations. The operator, by then listening to these selected portions, can determine whether to intervene in the simulated conversation.

Telephone answering systems have developed to the point where simulated conversations are now possible. Such systems are capable of answering a ringing telephone line and playing a series of prerecorded messages to the caller. The caller's responses to these messages are recorded by the system for later review. One of the important advantages of these systems is that the information imparted by the caller may be extracted from the recorded responses more quickly than from the live caller. This allows a given number of operating personnel to service a larger number of calls than otherwise would be possible.

For example, a conversation simulator may be used to record requests for taxi cabs. In this application, the simulator would employ recorded messages to ask the caller when and where the taxi cab was needed. An operator would then review the recorded information and dispatch the cab.

It is often desirable to provide a monitor for use with a conversation simulator which broadcasts the caller's responses on a speaker as they are being recorded by the simulator. The operator can listen to the responses to determine whether the caller's needs are being met by the simulator. For instance, in the above example, an operator could determine by listening to the speaker if a caller were asking for price information rather than ordering a cab. The operator could then intervene to answer the particular questions of the caller.

Though various monitors have been used, they are subject to certain drawbacks and deficiencies. One disadvantage of prior art monitors is that they have typically transmitted all caller responses to the operator via the speaker. Thus, the operator was required to listen to all responses in order to select those callers who needed assistance. In many cases, this resulted in an unnecessarily large number of responses being transmitted over the monitor. Thus, in the above example, a nonselective monitor would carry all of the standard responses involved in ordering a cab as well as the nonstandard responses which require assistance. In such case, the nonselective monitor of the prior art could be unduly distracting to the operator. These unnecessary distractions may significantly reduce the working efficiency of the operators in some applications.

SUMMARY OF THE INVENTION

The present invention is directed to a selective monitor which alerts the operator only to those caller responses which meet preselected criteria. In this way, an important fraction of the standard responses is never brought to the operator's attention, and the operator is thereby freed for other activities.

The selection criteria used to determine which caller responses are to be brought to the attention of the operator may be chosen to fit the particular application. In some cases, it may be sufficient to transmit particular responses over a monitor speaker, thereby alerting the operator. For example, if the first precorded message asks the caller if he is calling to request a cab, the monitor may be programmed to transmit only the response to this message over the monitor speaker. If the caller answers affirmatively, the operator can allow the conversation simulator to take the order without hearing the details of the order. If the caller answers negatively, the operator can intervene.

In other cases, it may be desirable to transmit over a monitor speaker that portion of a caller's answers which extend beyond a predetermined time period. Often a caller who makes requests which are not met by the conversation simulator will respond at length, explaining his reason for calling. Thus, by transmitting only that portion of the responses which extends beyond the predetermined response time, the operator will hear many of the responses requiring operator intervention without hearing most of the standard responses. If the conversation simulator has the capacity for waiting until the caller pauses before resuming the sequence of prerecorded messages, the time delay between the end of one precorded message and the start of the next prerecorded message may be used as an indication of the duration of the caller's response.

In some applications, the standard response to certain prerecorded messages may have a predictable, short duration. For example, in the cab dispatching simulator described above, a precorded message asking for the apartment number will usually be answered with a short phrase if the caller is satisfied that the question should be answered. The monitor may be constructed to transmit to a speaker only that portion of responses to this message which extends beyond a short period, such as ten seconds. In this way, many of the callers who explain why the apartment number is not relevant to their reason for calling will be heard over the monitor speaker.

Other applications may employ other selection criteria, such as the presence or absence of certain words in a caller's response, to determine which responses activate the monitor. The monitor itself may be constructed to alert the operator to a response which meets the selection criteria by generating an alert signal, such as a light or a sound, rather than by transmitting the response to a speaker.

BRIEF DESCRIPTION OF THE DRAWINGS

The invention, together with further objects and attendant advantages, will best be understood by reference to the following description taken in connection with the accompanying drawings, in which.

DETAILED DESCRIPTION OF A PREFERRED EMBODIMENT

Figure 1:
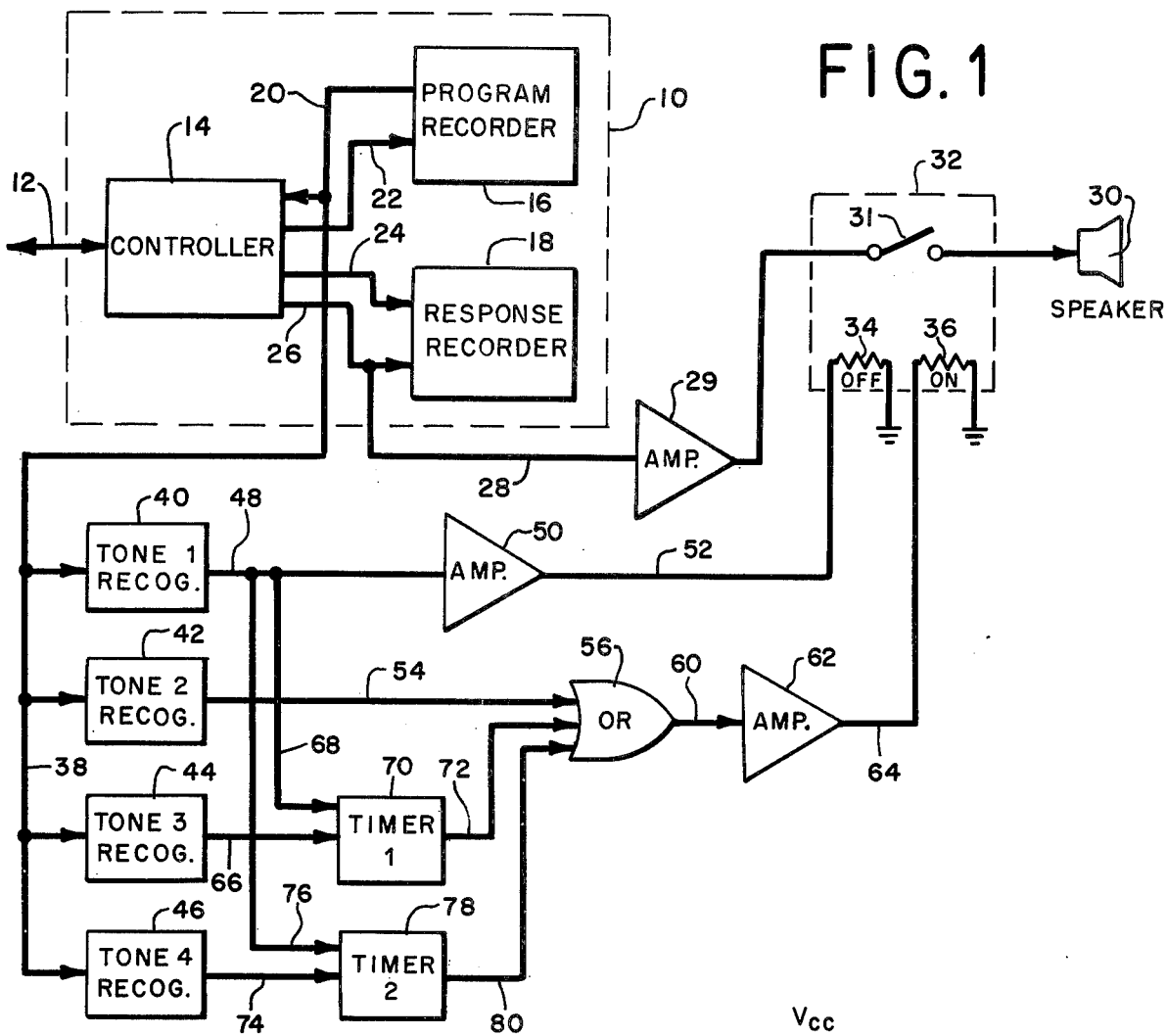
FIG. 1 is a schematic block diagram of an apparatus including a preferred embodiment of the invention.

Referring now to the drawings, FIG. 1 schematically shows a preferred embodiment of the invention as used in an automatic telephone answering system 10 which functions as a conversation simulator. The system 10 includes a controller 14, a program recorder 16, and a response recorder 18. The program recorder 16 serves to store a prerecorded sequence of messages and associated control tones, while the response recorder stores the caller's responses to the prerecorded messages. The controller 14 is connected to a telephone voice line 12 and operates to alternately energize the two recorders 16, 18.

In operation, the controller 14 plays a message from the program recorder 16 which is transmitted to the caller through the telephone line 12. The program recorder 16 reproduces a series of control tones which are associated with the prerecorded message. For example, a control tone having a particular frequency may be associated with the start of a prerecorded message and a second tone having a second frequency may be associated with the stop of the message. As described below, these control tones may be used as inputs to a selective monitor.

In the schematic diagram of FIG. 1 the controller 14 issues start and stop commands to the recorders 16, 18 through the control lines 22 and 24, respectively. Prerecorded messages are transmitted from the program recorder 16 to the controller 14 through a voice line 20, and responses are transmitted from controller 16 to the recorder 18 through a voice line 26. The recorders 16, 18 may be of any suitable type such as the continuous loop recording systems sold by Dictaphone under the name "Thought-Tank" or by Lanier under the name "Nyematic".

In the preferred embodiment, the controller 14 includes voice activated circuitry which is used to sense the caller's voice. This delays playing the next prerecorded message from recorder 16 until after the caller has paused in his response to the last prerecorded message for a preselected interval. A suitable controller 14 is disclosed in my co-pending U.S. patent application Ser. No. 604,930, entitled Programmed Conversation Recording System, filed Aug. 15, 1975. However, it should be understood that this invention is not limited to use with such controllers, and may advantageously be used with controllers which alternately cycle the two recorders 16, 18 at fixed intervals.

The voice responses which are recorded on recorder 18 are also transmitted via a conductor 28 to an amplifier 29. The amplified voice responses are then carried to a selective monitor such as a speaker 30. A switch such as a latching relay 32 provided with coils 34 and 36, is placed between the amplifier 29 and the speaker 32. When coil 34 is energized, the relay 32 latches the switch 31 open; switch 31 remains open until coil 36 is energized, at which time the switch 31 closes. The apparatus of this invention controls the state of the latching relay 32 so that only those responses which meet certain preselected criteria are passed to the speaker 30.

In this embodiment, the selective monitor is responsive to a set of four control tones recorded and played in association with the prerecorded messages. These tones are preferably audio tones in the range of 100 to 3,000 Hertz, which are recorded on a separate channel of the program tape in the program recorder 16. For example, the tones may be of approximately one tenth of a second duration at frequencies of 100, 1,000, 2,000, and 3,000 Hertz. If it is necessary to sound more than one control tone at the same time, the tones may be superimposed.

As shown in FIG. 1, voice line 20 of system 10 is also coupled via an input conductor 38 to a plurality of tone recognition circuits 40, 42, 44 and 46. Tone recognition circuit 40, which is shown in greater detail in FIG. 2, produces an output pulse at an output 48 whenever a first control tone is presented on input conductor 38. Output pulses appearing on conductor 48 are amplified by an amplifier 50 and transmitted via conductor 52 to coil 34, where they serve to open the switch 31 in the latching relay 32, thereby actuating the monitor.

The first control tone, for example, a 100 Hertz tone, is preferably placed at the start of each prerecorded message and is used to turn off the monitor before the start of each prerecorded message. This prevents prerecorded messages, and the responses which follow, from being broadcast over the speaker 30. Thus, at the start of each response, the speaker 30 is disabled and the response is not broadcast unless the characteristics of the response cause the selective monitor to close the latching relay 32.

Tone recognition circuit 42 is similar to tone recognition circuit 40, but differs in that it is tuned to detect a second control tone. Thus, tone recognition circuit 42 produces an output pulse on a conductor 54 only when the second control tone is presented on the input conductor 38. This output pulse on conductor 54 is passed to an OR gate 56, whose output is amplified by amplifier 62, and applied to a coil 36 via a conductor 64. The switch 31 is latched closed when the amplified output is applied to coil 36 and the speaker 30 is enabled. The second control tone is recorded in association with the end of preselected recorded messages and the caller's response to these preselected messages are broadcast on the monitor.

In this preferred embodiment, the controller 14 is of the type that senses the duration of a caller's response and delays initiation of the next prerecorded message until after the caller has paused for a certain time after making a response. This embodiment includes additional circuits which activate the monitor whenever a caller's responses extend beyond a predetermined time period. Because many nonstandard responses are longer than their standard counterparts, the system has sufficient discrimination capabilities to selectively broadcast nonstandard answers over the speaker 30. It should be understood that alternate embodiments of the selective monitor of this invention may be advantageously used with answering systems which do not include duration sensing controllers such as controller 14. For example, one alternate embodiment operates as described above to broadcast preselected responses on the monitor.

Still referring to FIG. 1, these capabilities are achieved by using tone recognition circuit 44 to time all responses. A third control tone, recorded in association with the end of every prerecorded message, is input to tone recognition circuit 44 through conductor 38. When the third control tone is presented on conductor 38, the third tone recognition circuit 44 produces an output pulse on a conductor 66 which is passed to a first input of a timer 70. Timer 70 also has a second input which receives a signal from the first tone recognition circuit 40 via conductor 68. The timer 70 is described in greater detail in conjunction with FIG. 3. In this context, however, it is sufficient to note that the timer 70 produces an output pulse at conductor 72 if any response extends beyond a predetermined interval.

The output pulse applied at conductor 72 is passed by the OR gate 56, amplified and applied across through the coil 36 to close the switch 31. The timer 70 is started by a pulse from the third tone recognition circuit 44 which is associated with the end of every message, and is stopped by a pulse from the first tone recognition circuit 40 associated with the start of every message.

The time interval between the end of one message and the start of the next is a measure of the length of the caller's response. Thus, timer 70 is constructed to produce an output pulse, thereby enabling the monitor, if the first control tone is separated from the third control tone by more than a predetermined interval. In this embodiment, that interval may be about twenty seconds.

A fourth tone recognition circuit 46 is also provided which cooperates with a second timer 78 in much the same manner as tone recognition circuit 44 cooperates with timer 70. The only significant differences are that the fourth control tone is associated only with the end of certain prerecorded messages, and the timer 78 is set for a shorter time interval, such as 10 seconds. Thus, recognition circuit 46 and timer 78 cooperate to enable the speaker 30 if responses to preselected messages extend beyond a predetermined interval.

Figure 2:
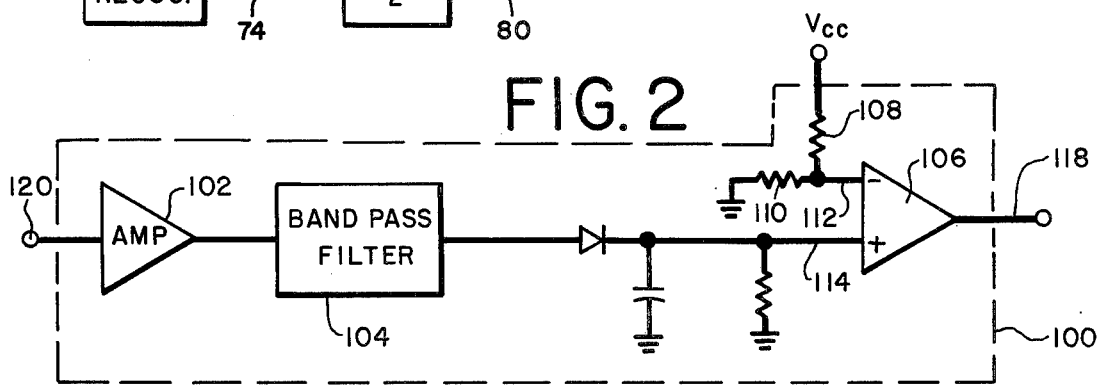
FIG. 2 is a schematic diagram of a first portion of the apparatus of FIG. 1.
Figure 3:
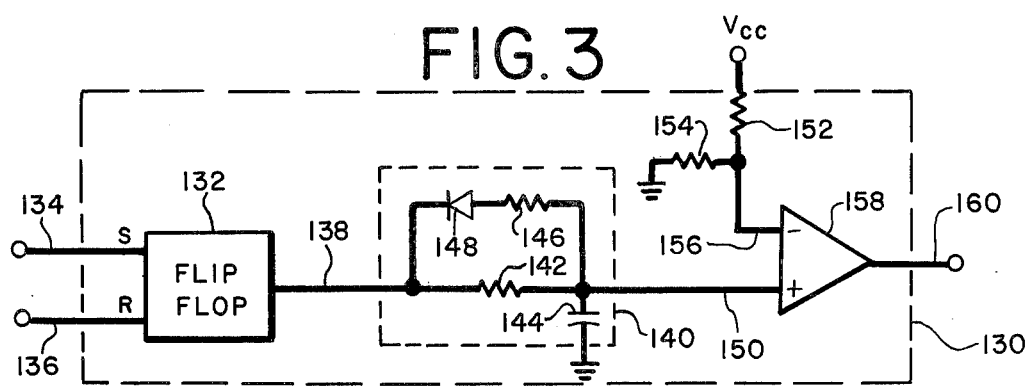
FIG. 3 is a schematic diagram of a second portion of the apparatus of FIG. 1.

FIGS. 2 and 3 depict suitable circuits for use as the tone recognition circuits 40, 42, 44, 46, and the timers 70, 78 of the preferred embodiment. Referring first to FIG. 2, an exemplary tone recognition circuit identified by reference numeral 100, includes an amplifier 102, a band pass filter 104, and a comparator 106. A resistor chain comprising two resistors 108, 110 is used to generate a threshold voltage at a first input 112 of the comparator 106. When the output voltage of the band pass filter 104 on a second input 114 exceeds the threshold voltage on input 112, the output 118 of the comparator goes high and stays high as long as the voltage at input 114 exceeds that of input 112.

This tone recognition circuit 100 operates to produce a voltage at output 118 when a preselected control tone is presented on input 120. The signal on input 120 is amplified by amplifier 102 and then applied to the band pass filter 104, which functions in a well known manner to transmit signals within a preselected frequency range to output 114. When a control tone having a frequency within this range is passed by the filter 104 to the comparator 106, the output 118 goes high.

The circuit of FIG. 3 is a timer circuit identified by reference numeral 130, and is suitable for use as timer 70 or 78. The circuit 130 has two signal inputs 134, 136 which are connected to a set-reset flip flop 136 having an output 138. In accordance with the operation of flip flop 136, a pulse on input 134 causes the signal at output 138 to go high, and a pulse on input 136 causes the signal at output 138 to go low. The output 138 is coupled to an R-C filter 140 which in turn is coupled to a first input 150 of a comparator 158. A threshold voltage is generated by a resistor chain made up of resistors 152, 154 and supplied to a second input 156 of the comparator 158.

The R-C filter 140 includes a charging resistor 142 and a capacitor 144 which is grounded on one side. Current supplied from output 138 passes through the resistor 142 and charges the capacitor 144. The voltage applied to first input 150 rises as the capacitor 144 is charged, and this charging continues as long as the signal at output 138 of flip flop 132 is high. When this signal at output 138 returns to the low voltage state, the capacitor 144 discharges quickly through resistor 146 and diode 148. Resistor 146 is of lower resistance than the charging resistor 142, and, therefore, the R-C filter 140 resets quickly. Summarizing the operation of circuit 130, when a pulse appears on input 134, it forces the signal at output 138 high, causing current from the flip flop 132 to charge the capacitor 144. When the charge on capacitor 144 exceeds the threshold voltage on input 156, the comparator output goes high. A pulse on input 136 will cause the capacitor 144 to stop charging, thereby resetting the R-C timer 140.

From the above discussion, it may be seen that the preferred embodiment of FIG. 1 uses three separate selection criteria to activate the speaker 30. In particular, it operates to broadcast (1) preselected responses, (2) preselected responses lasting longer than a first predetermined time, and (3) responses lasting longer than a second predetermined time. For example, this embodiment could be used to broadcast on the monitor only the response to the first message, the portions of the responses to the fifth and seventh messages which extend beyond ten seconds, and the portions of all responses which extend beyond thirty seconds.

It should be understood that various changes and modifications to the preferred embodiment described herein will be apparent to those skilled in the art. For example, digital controls instead of analog control tones may be used to transmit information from the automatic answering system to the selective monitor. Alternately, selection criteria other than those described may be used to determine when the monitor is activated. For instance, the monitor may be actuated only during the initial portion of a caller's response in order to permit the operator to quickly determine whether te caller's requests can be met by the conversation simulator. Furthermore, the selective monitor of this invention is not limited to embodiments which employ a speaker as the monitoring means; alternate embodiments may employ other monitoring means, such as a flashing light, a buzzer, or an automatic ring through apparatus, which are activated to alert the operator of a caller response which meets the selection criteria. Such changes and modifications can be made without departing from the scope of the present invention and without diminishing its attendant advantages. It is, therefore, intended that such changes and modifications be covered by the following claims.

I claim:

1. In an automatic telephone answering apparatus including means for automatically answering a call, means for presenting a voice message, means for recording a caller's response to the voice message, and means for monitoring the caller's response, the improvement comprising:
   means for automatically generating a signal associated with the extension of the caller's response beyond a predetermined time interval;
   means for automatically activating the monitoring means in response to the signal; and
   means for automatically deactivating the monitoring means after a period of operation of the monitoring means.

2. The improvement of claim 1 wherein the deactivating means operates to deactivate the monitoring means at about the termination of the caller's response.

3. In an automatic telephone answering apparatus including means for automatically answering a call placed by a caller, means for presenting a sequence of voice messages to the caller, means for recording the caller's responses to the voice messages, and means for monitoring the caller's responses, the improvement comprising:
   means for automatically generating a signal associated with the prolongation of the caller's response to a selected voice message beyond a predetermined time interval;

means for automatically enabling the monitoring means following the generation of the signal; and means for automatically disabling the monitoring means no later than about the termination of the caller's response to the selected voice message.

4. In an automatic telephone answering apparatus including means for automatically answering a call placed by a caller, means for presenting a sequence of voice messages to the caller, means for recording the caller's responses to the voice messages, and means for monitoring the caller's responses, the improvement comprising:

means for automatically activating the monitor during the caller's response to a selected voice message; and means for automatically deactivating the monitoring means at about the termination of the caller's response to the selected voice message, said activating and deactivating means cooperating to render the monitoring means operational for a variable time interval, the extent of which is partially determined by the duration of the caller's response.

5. In an automatic telephone answering apparatus including means for automatically answering a call placed by a caller, means for presenting a sequence of voice messages to the caller, means for recording the caller's responses to the voice messages, and means for monitoring the caller's responses, the improvement comprising:

means for automatically activating the monitoring means when the response to any of a first set of preselected voice messages extends beyond a first time interval;

means for automatically activating the monitoring means when the response to any of a second set of preselected voice messages extends beyond a second time interval, shorter than the first time interval; and means for automatically deactivating the monitoring means after a period of operation of the monitoring means.

6. The improvement of claim 5 wherein the deactivating means operates to deactivate the monitoring means in response to the termination of a response during which the monitoring means has been activated.

7. A programmable monitor for a telephone answering apparatus which automatically presents a series of voice messages to a caller and records the caller's responses thereto, said monitor comprising:

first means for designating a fist set of caller responses, the responses in said first set freely selectable from the total number of responses;

means for activating the monitor during each of the designated caller responses; and means for deactivating the monitor at about the termination of each of the caller responses during which the monitor has been activated.

8. The monitor of claim 7 further comprising:

second means for designating a second set of caller responses; and means for activating the monitor when any of the responses designated by the second means extends beyond a first time interval.

9. The monitor of claim 8 further comprising:

third means for designating a third set of caller responses; and means for activating the monitor when any of the responses designated by the third means extends beyond a second time interval, shorter than the first time interval.

* * * * *

UNITED STATES PATENT AND TRADEMARK OFFICE
CERTIFICATE OF CORRECTION

PATENT NO. : 4,152,547
DATED : May 1, 1979
INVENTOR(S) : Peter F. Theis

It is certified that error appears in the above-identified patent and that said Letters Patent are hereby corrected as shown below:

Col. 4, line 28, add an --s-- at the end of response.

Col. 8, line 15, delete "fist" and insert --first-- therefor.

Col. 2, line 2, delete "precorded" and insert --prerecorded-- therefor.

Col. 2, line 23, delete "precorded" and insert --prerecorded-- therefor.

Col. 2, line 29, delete "precorded" and insert --prerecorded-- therefor.

Col. 6, line 27, delete "te" and insert --the-- therefor.

Signed and Sealed this

Sixth Day of November 1979

[SEAL]

Attest:

RUTH C. MASON
Attesting Officer

LUTRELLE F. PARKER
Acting Commissioner of Patents and Trademarks